(12) United States Patent
Landry et al.

(10) Patent No.: US 8,230,006 B2
(45) Date of Patent: Jul. 24, 2012

(54) REMOTE CLIENT MANAGEMENT

(75) Inventors: John A. Landry, Spring, TX (US); Eric Gagneraud, Houston, TX (US); Daniel Robert Oswalt, Houston, TX (US); Cesar Augusto Rosa, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 215 days.

(21) Appl. No.: 12/639,109

(22) Filed: Dec. 16, 2009

(65) Prior Publication Data
US 2011/0145322 A1    Jun. 16, 2011

(51) Int. Cl.
G06F 15/16    (2006.01)

(52) U.S. Cl. ........ 709/203; 709/201; 709/202; 709/217; 709/223; 709/231

(58) Field of Classification Search .................. 709/203, 709/201, 202, 217, 223, 231
See application file for complete search history.

(56) References Cited

U.S. PATENT DOCUMENTS

| 5,841,972 A | 11/1998 | Fanshier | |
| 2003/0066065 A1* | 4/2003 | Larkin | 717/177 |
| 2007/0214215 A1* | 9/2007 | McCaleb et al. | 709/203 |
| 2010/0131939 A1* | 5/2010 | Hieb et al. | 717/169 |

\* cited by examiner

*Primary Examiner* — Lan-Dai T Truong
(74) *Attorney, Agent, or Firm* — Jared S. Engstrom

(57) ABSTRACT

A method for managing remote clients includes retrieving a client version identifier for an application program running on a client. The client version identifier is compared with a master version identifier for a master configuration file on a server. An active configuration of the application program on the client is altered while the application program is running.

15 Claims, 4 Drawing Sheets

REMOTE CLIENT MANAGEMENT

BACKGROUND

Many businesses ship and support multiple products world-wide. One challenge facing such businesses is that of delivering services, content, diagnostics, utilities and support information to meet the customer requirements in various geographic regions and across different product segments.

BRIEF DESCRIPTION OF DRAWINGS

The following description includes discussion of figures having illustrations given by way of example of implementations of embodiments of the invention.

DETAILED DESCRIPTION

Figure 1:
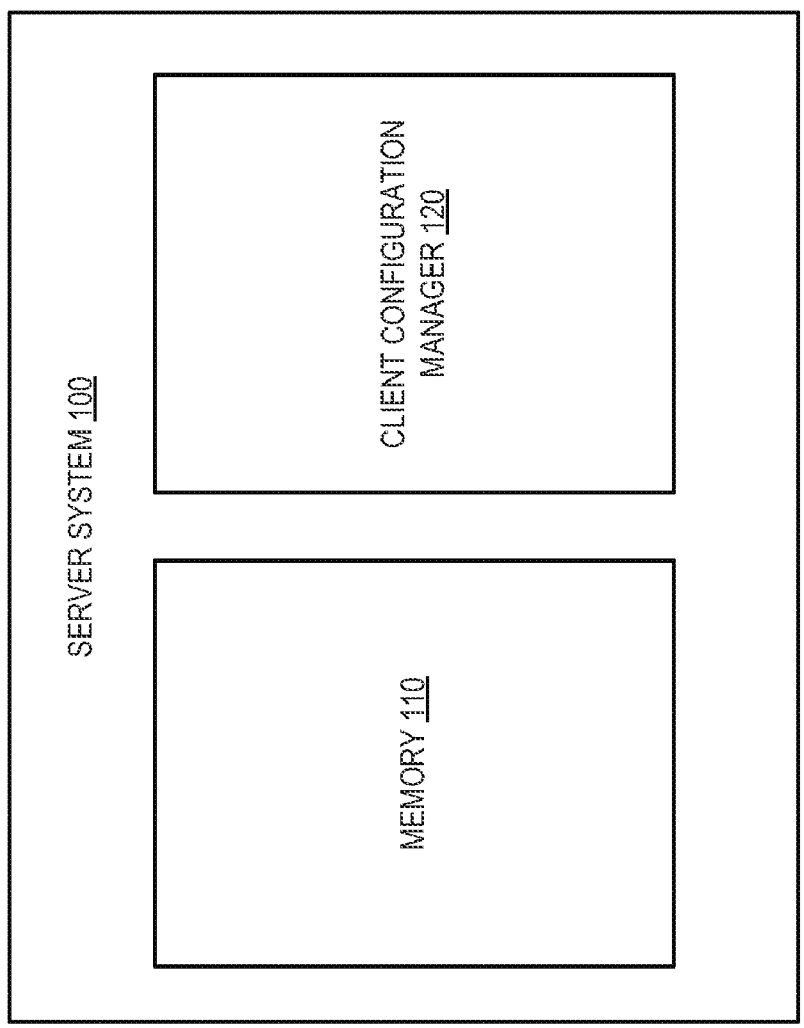
FIG. 1 is a block diagram illustrating a system according to various embodiments.

As provided herein, various methods and systems facilitate management of client resources by location, product and entitlement. Client systems (e.g., desktops, workstations, notebooks, handheld devices, all-in-one systems, etc.) often include one or more client-based support applications that are pre-configured on the systems before they are shipped. This limits the flexibility in managing these systems when the support applications are locked down—sometimes for months—prior to shipment of the product.

After a product has shipped, changes can be applied to the product by providing an update of the client-based support application(s) that were pre-installed before the product shipped. Such updates may be targeted to clients through a complex installer, which does not allow for timely changes to the serviceability of the client system. Targeted updates are complex to manage and difficult to deploy. In addition, such updates frequently involve customers and/or users downloading and installing the update based on different factors, such as location, product type, and entitlement.

In other cases, web-based support applications may be used to provide support for client resources. These web-based applications can decrease the user experience and may be further limited by requiring a web-browser with access to the Internet. Also, security limitations on web-browsers can sometimes limit the availability and/or functionality of various diagnostic tools, utilities, etc.

In various embodiments, a resource framework capable of managing and servicing a client system environment includes a collection of one or more resources such as services, diagnostics, utilities and/or other content. As used herein, the term "provider" is used to describe the provider of the services described herein. A provider may, for example, provide services via an enterprise architecture, using web-services, managing one or more servers, etc. As used herein, the term "customer" is used to describe a recipient of services provided by a provider. Unless specified otherwise, a customer is associated with a client system and/or product, the client environment, an end-user, etc.

In various embodiments, the resource framework enables a provider to dynamically manage resources available to a customer by location, product and entitlement. Entitlement, as used herein, refers to a customer's service and warranty entitlement. In other words, a customer's entitlement determines the type, frequency, level and/or other bounds of provider support to which the customer is entitled based on a contract, purchase agreement or other relationship between provider and customer.

In various embodiments, the resource framework includes a configuration application, a resource server and a resource configuration utility. The provider uses the configuration utility to add, remove, enable or disable resources as needed. In various embodiments, the configuration utility may be managed via a user interface. Resources might include:

- Services—Support option(s) available to a customer such as, phone support, remote assistance, web-based assistance, etc.
- Diagnostics—Test(s) to determine if the client system is functioning correctly. Examples include optical disk test, hard disk test, battery test, etc.
- Content—Knowledge to assist in using or troubleshooting the client system.
- Utilities—Application(s) used to configure or manage the client system.

Resources can be targeted to a client system based on product (e.g., product line, model, product tag, etc.), location, and/or entitlement (e.g., warranty terms, service contract, etc.).

The resource configuration utility enables the provider to select the resources they want to offer. The resource offering can be changed at any time by simply updating the configuration utility (e.g., via a user interface) and publishing the changes to the server. In turn, the client updates the customer's configuration with the resource updates when the client checks for support updates (e.g., on a periodic basis).

FIG. 1 is a block diagram illustrating a system according to various embodiments. Server system 100 includes a memory 110 and a client configuration manager 120. Memory 110 stores configuration code associated with a client application. The configuration code defines and/or determines the particular resources available on a particular client system.

Client configuration manager 120 provides configuration code updates for the client application to the client. Updates may be scheduled on a periodic basis or they may be sent to clients on demand, for example, based on a request for an up-to-date version of the client support application. In various embodiments, configuration code updates are transmitted via a network connection between server system 100 and a target client using hypertext transfer protocol (HTTP). Other suitable protocols (e.g., SOAP, XML, SNMP, etc.) could be used in different embodiments. Configuration code updates can be automatically targeted to customers based on customer location, product type, and/or entitlement.

Client configuration manager 120 can provide configuration code updates for the client application while the client application is running on a customer client system. Once received, the configuration code updates are executable by the client application without having to restart the client application. In other words, an execution period may define a period during which the application is running. Once the application is stopped, closed, etc., the execution period ends. The configuration code updates described herein may be applied and/or become active during the same execution period in which they are received by the application. In certain embodiments, this is accomplished by shadow copying configuration file updates from server system 100 to the client system.

Shadow copying a configuration file update is accomplished either by making a full copy of the updated configuration file on server system 100 or by making a differential copy of the updated configuration file (as compared, for example, to the most recent configuration stored on the client system). In either case, client configuration manager 120 sends the shadow copy configuration volume to the client system to be stored in the client support application program directory with the original configuration volume.

In addition to the shadow copy configuration volume, server system 100 sends configuration code that directs the customer system to use the shadow copy configuration volume as the "active" configuration volume instead of the original configuration volume. In this way, configuration file updates sent to the client system may be applied while the client support application on the client system is running without having to restart the client support application after the updates are received.

Figure 2:
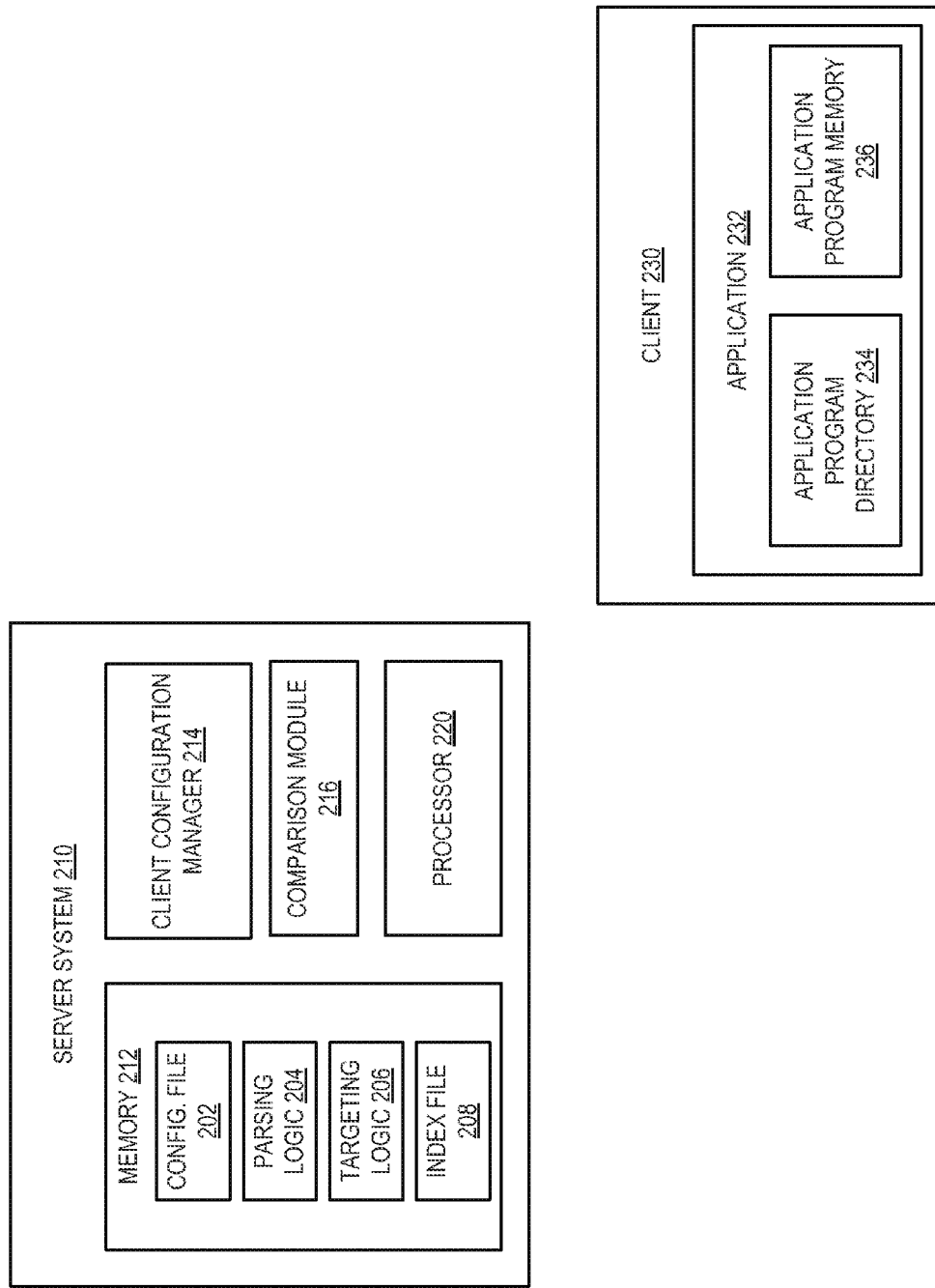
FIG. 2 is a block diagram illustrating a system according to various embodiments.

FIG. 2 is another block diagram of a system according to various embodiments. Server system 210 includes a memory 212, a client configuration manager 214 and a comparison module 216. Configuration file 202 may be a versioned configuration file stored as a dynamic link library (DLL) in memory 212. In various embodiments, there may be a different configuration file for each product line being managed by client configuration manager 214.

Various modules and/or components of system 210 (e.g., comparison module 216, configuration manager 214, etc.) may be implemented on one or more hardware modules, special-purpose hardware (e.g., application specific hardware, application specific integrated circuits (ASICs), embedded controllers, hardwired circuitry, etc.), a computer-readable storage medium (e.g., memory 212) with instructions executed by a processor 220, or some combination of these. Also, various modules and/or components described herein may be a means for performing the functions described herein.

XML file 208 contains an index that stores version information for configuration file 202. Comparison module 216 compares the version information in XML file 208 with version information from application 232. Based on this information, comparison module 216 determines the extent of any configuration file updates needed for application 232.

Client configuration manager 214 provides configuration file updates for application 232 to client 230. Configuration file updates may include some combination of configuration file 202, parsing logic 204 and/or targeting logic 206. Based on version information determined by comparison module 216, either a differential copy or a full copy of configuration file 202 may be included in the update. In either case, the copy of configuration file 202 includes updated configuration information not currently residing on client 230. Parsing logic 204 includes code defining how client 230 is to parse configuration file 202.

Targeting logic 206 includes code to manage automatic targeting of updates based on client location, client entitlement, and/or client type. In various embodiments, configuration file 202 is published to server 210 in folders based on, for example, product lines. Other suitable folder classifications could be used. In the case of product lines, each product in the product line may have an embedded product line code that can be used to determine the appropriate configuration file folder when querying for available updates. The product line code may be overridden with a pseudo or sub-level product line code. Such alternate codes can be used to target sub-set of a product line or to tag certain products with a specialized code.

In embodiments where configuration file 202 is associated with a client support application, support resources, content, and services are defined within configuration file 202. Individual resources, content and services may be further targeted by product name and/or product model number which may be embedded in client 230. Services, in particular, may be targeted by client location and entitlement. Location may be determined by user selection, IP address, global positioning system (GPS) tracking, or other suitable mechanism. Entitlement status is determined by a web service in certain embodiments.

In various embodiments, configuration file 202, parsing logic 204 and targeting logic 206 are packaged into a DLL. Based on the comparison of comparison module 216, DLLs and/or executables associated with application 232 that have a newer version on server system 210—as compared to the version on client 230—are copied to the application's program directory 234. In certain embodiments, the copying between server 210 and client 230 is done via HTTP, although other suitable protocols may be used in different embodiments.

Generally, DLLs cannot be copied into an application (e.g., application 232) while the application is open and running since DLLs are loaded into the application's program memory. However, in various embodiments, DLLs are copied from server 210 to application program directory 234 before loading them into application program memory 236. In certain embodiments, Shadow Copy technology Microsoft Windows, available from Microsoft Corporation of Redmond, Wash. is used to update program memory 236 with any new DLLs copied into application program directory 234. Other suitable forms of copying (e.g., using a versioning system, etc.) could be used in different embodiments.

Based on the shadow copying described above, application 232 may have multiple copies of a DLL in application program directory 234 while having the ability to use the most recent version in application program memory 236. In this way, configuration file 202, along with its associated logic, can be updated on application 232 while application 232 is running without having to close and/or restart application 232.

Figure 3:
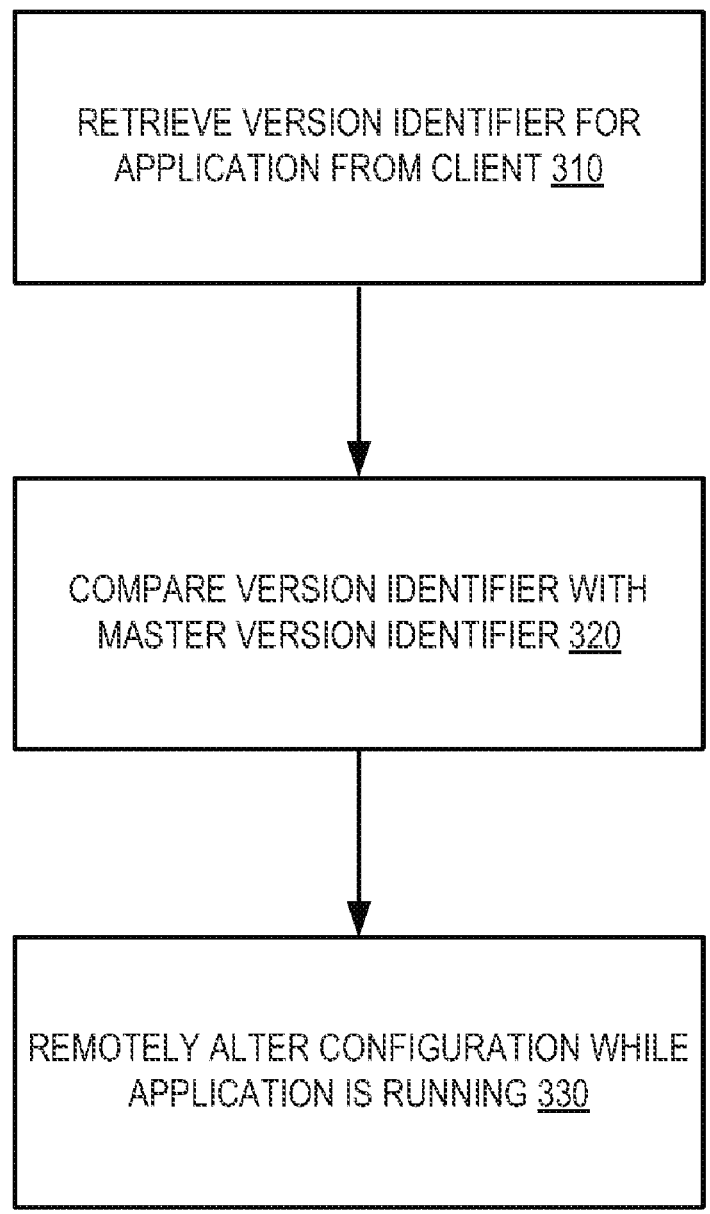
FIG. 3 is a flow diagram of operation in a system according to various embodiments.

FIG. 3 is a flow diagram of operation in a system according to various embodiments. A server system retrieves 310 a version identifier for an application program on a client. In various embodiments, the application program is a server-managed client support application. However, other applications amenable to remote management could also be used in different embodiments. The server system may retrieve the version identifier directly from the client on which the application is running or the version identifier may be retrieved from another source (e.g., a third party). In some embodiments, the server system maintains a record of the version identifier for a particular client and thus the server system may retrieve the identifier via the record stored on the server system.

The server system compares 320 the retrieved version identifier for the client application with a master version identifier for a master configuration file associated with the client application. In various embodiments, the master configuration file is maintained on the server system. Based on the comparison, the server system can determine whether the client system has the newest configuration for the application running on the client system.

If the application configuration on the client system is subject to an update, the server system remotely alters 330 the active configuration of the application while the application is running on the client system. In other words, the server system updates the configuration of the application while the application is running and without closing and/or restarting the application. Thus, the configuration of the application can be altered while the application is active with minimal or no interruption to the user experience.

In various embodiments, the configuration of the application is altered via shadow copying. As discussed above, shadow copying is accomplished either by making a full copy of a configuration file on a server system or by making a differential copy of the configuration file (as compared, for example, to the most recent configuration stored on the client system). In either case, the server system sends the shadow copy configuration volume to the client system to be stored in the client support application program directory with the original configuration volume.

In addition to the shadow copy configuration volume, the server sends configuration code that directs the customer system to use the shadow copy configuration volume as the "active" configuration volume instead of the original configuration volume. In this way, configuration file updates sent to the client system may be applied while the client support application on the client system is running without having to restart the client support application after the updates are received.

Figure 4:
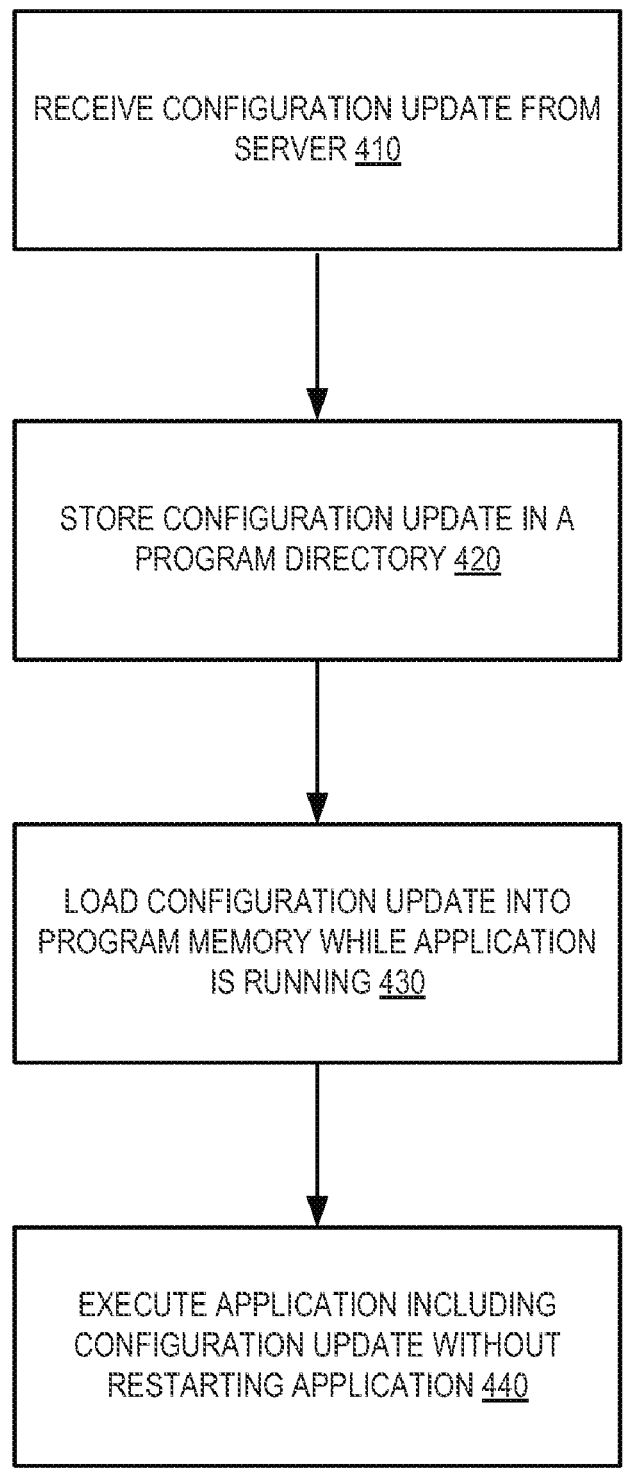
FIG. 4 is a flow diagram of operation in a system according to various embodiments.

FIG. 4 is another flow diagram of operation according to various embodiments. A client system receives 410 a configuration update for an application (e.g., a client support application) from a server. The client system stores 420 the configuration update in a program directory for the application. In various embodiments, the configuration update is stored in the application's program directory while the application is running on the client system. While the application is running, and without having to close and/or restart the application, the client system loads 430 the configuration update into the application's program memory. In other words, by storing multiple versions of the application configuration file in the application program directory, the application can swap versions loaded into program memory while the application is running. The client system continues to execute 440 the application, including the configuration update, without having to restart the application.

The invention claimed is:

1. A method, comprising:
    retrieving a client version identifier for an application program on a client;
    comparing the client version identifier for the application program with a master version identifier for a master configuration file associated with the application program, the master configuration file maintained on a server; and
    remotely altering an active configuration of the application program on the client while the application program is running,
    in which remotely altering an active configuration of the application program comprises:
        sending a shadow copy configuration volume to the client, and
        sending configuration code that directs the client to use the shadow copy configuration volume as an active configuration volume.

2. The method of claim 1, in which remotely altering the active configuration of the application program further comprises
    causing the shadow copy configuration volume to be stored in a program directory associated with the application program before loading the shadow copy configuration volume into a memory location designated for the application program.

3. The method of claim 2, further comprising:
    sending code to automatically target a client application program update based on one or more of client location, client entitlement, or client type.

4. The method of claim 2, further comprising:
    sending code containing logic to parse a configuration file.

5. The method of claim 1, wherein a configuration file update includes one or more dynamic link libraries (DLLs) or executable files.

6. The method of claim 1, wherein the application program is a server-managed client support application.

7. The method of claim 1, wherein the master configuration file maintained on the server applies to a product line and a update is specific to a subset of the product line.

8. A server system, comprising:
    a memory to store configuration code associated with an application on a client; and
    a client configuration manager to remotely change a configuration of the application via a configuration code update for the application during an execution period of the application on the client responding to comparing a client version identifier for the application with a master version identifier for a master configuration file associated with the application, the master configuration file maintained on the server system, wherein the configuration code update is executable by the application during the execution period in which the client configuration manager sends configuration code that directs the client to use a shadow copy configuration volume as an active configuration volume, wherein the shadow copy configuration volume is sent to the client from the server system.

9. The server system of claim 8, further comprising a comparison module to compare version information for the application on the client to version information for the configuration code stored in the memory.

10. The server system of claim 8, wherein the configuration code stored in the memory comprises at least:
    a configuration file; and
    logic to manage automatic targeting of application updates based on one or more of client location, client entitlement, or client type.

11. The server system of claim 10, wherein the configuration code stored in the memory further comprises:
    logic to parse the configuration file.

12. A computer-readable storage medium comprising computer usable program code embodied therewith, the computer usable program code comprising:
    computer usable program code to, when executed by a processor, receive, from a server, a configuration update for an application program via a network connection responding to comparing a client version identifier for the application program with a master version identifier for a master configuration file associated with the application program, the master configuration file maintained on the server;
    computer usable program code to, when executed by a processor, load the configuration update into program memory associated with the application program to remotely alter an active configuration of the application program while the application program is executing;
    computer usable program code to, when executed by a processor, receive a shadow copy configuration volume;
    computer usable program code to, when executed by a processor, direct a client to use the shadow copy configuration volume as an active configuration volume.

13. The computer-readable storage medium of claim 12, further comprising:

computer usable program code to, when executed by a processor, execute the application program including the configuration update without restarting the application program.

14. The computer-readable storage medium of claim 12, wherein the configuration update includes a dynamic link library (DLL) and wherein the program directory in which the configuration update is stored contains multiple DLLs.

15. The computer-readable storage medium of claim 12, further comprising:

computer usable program code to, when executed by a processor, change functionality provided to a user of the application program in response to loading the configuration update into the program memory.

* * * * *